United States Patent
Jang et al.

(10) Patent No.: US 9,329,724 B2
(45) Date of Patent: May 3, 2016

(54) SIGNAL PROCESSING CIRCUIT FOR TOUCH SCREEN AND METHOD FOR CONTROLLING THE SAME

(71) Applicant: SILICON WORKS CO., LTD., Daejeon-si (KR)

(72) Inventors: Yeong Shin Jang, Daejeon-si (KR); Jung Min Choi, Daejeon-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 0 days.

(21) Appl. No.: 14/541,391

(22) Filed: Nov. 14, 2014

(65) Prior Publication Data

US 2015/0138115 A1   May 21, 2015

(30) Foreign Application Priority Data

Nov. 15, 2013 (KR) .................. 10-2013-0138763

(51) Int. Cl.
*G06F 3/041* (2006.01)

(52) U.S. Cl.
CPC .................... *G06F 3/0418* (2013.01)

(58) Field of Classification Search
CPC ...... G06F 3/041; G06F 3/0416; G06F 3/0418
See application file for complete search history.

(56) References Cited

U.S. PATENT DOCUMENTS

| | | | | |
|---|---|---|---|---|
| 7,400,318 B2 * | 7/2008 | Gerpheide | ............. | G06F 3/044 178/18.01 |
| 7,643,011 B2 * | 1/2010 | O'Connor | ............. | G06F 3/0418 345/156 |
| 8,487,907 B2 | 7/2013 | Huang et al. | | |
| 2008/0040079 A1 * | 2/2008 | Hargreaves | ........... | G06F 3/0418 702/191 |
| 2010/0259434 A1 * | 10/2010 | Rud | ........................ | H03M 1/08 341/155 |
| 2011/0057890 A1 * | 3/2011 | Goo | ....................... | G06F 3/0412 345/173 |
| 2012/0049869 A1 * | 3/2012 | Kremin | ................ | G06F 3/0412 324/679 |
| 2012/0256638 A1 * | 10/2012 | Van Antwerpen | .... | G06F 3/0418 324/613 |
| 2013/0300690 A1 * | 11/2013 | Yang | ..................... | G06F 3/0416 345/173 |
| 2013/0300692 A1 * | 11/2013 | Jang | ........................ | G06F 3/044 345/173 |
| 2014/0009408 A1 * | 1/2014 | Lee | ........................ | G06F 3/041 345/173 |
| 2015/0082011 A1 * | 3/2015 | Mellinger | ............ | G11C 29/021 713/1 |

* cited by examiner

*Primary Examiner* — Joe H Cheng (74) *Attorney, Agent, or Firm* — Kile Park Reed & Houtteman PLLC (57) ABSTRACT

The present disclosure relates to a signal processing circuit for a touch screen, which is capable of processing a sensing signal outputted from a touch screen panel, and a method for controlling the same. When pulses containing noise exist in the sensing signal, the signal processing circuit compensates for an integral signal in response to the pulses containing noise.

15 Claims, 8 Drawing Sheets

SIGNAL PROCESSING CIRCUIT FOR TOUCH SCREEN AND METHOD FOR CONTROLLING THE SAME

This application claims foreign priority to Korean Application Serial No. 10-2013-0138763, filed on Nov. 15, 2013.

BACKGROUND

1. Technical Field

The present disclosure relates to a touch screen, and more particularly, to a signal processing circuit for a touch screen, which processes a sensing signal outputted from a touch screen panel, and a method for controlling the same.

2. Related Art

A touch screen includes a touch screen panel using a driving signal, in order to determine a user's touch. The driving signal is provided to the touch screen panel, and the touch screen panel outputs a sensing signal in response to the driving signal. The user's touch may be determined through a change of the sensing signal outputted from the touch screen panel.

The driving signal or sensing signal of the touch screen may be affected by various noises. The various noises may include noise caused by power supplied to a display panel, noise caused by an external lighting, and noise caused by a user's finger.

When the touch screen is configured in an in-cell type, the touch screen may share parts of a display device. In this case, the driving signal or sensing signal of the touch screen may be affected by noise introduced from the display device.

When noise is not properly filtered from the sensing signal of the touch screen, it is difficult to accurately distinguish sensing signals between the case in which a touch occurs and the case in which no touch occurs. That is, it is difficult to accurately perform touch recognition.

SUMMARY

Various embodiments are directed to a technology for improving a signal-to-noise ratio by filtering noise contained in a sensing signal outputted from a touch screen panel.

Also, various embodiments are directed to a technology for detecting noise from a sensing signal outputted from a touch screen panel, filtering pulses containing noise to avoid noise, and integrating a sensing signal including periodic pulses to perform touch recognition.

Also, various embodiments are directed to a technology for detecting noise from a sensing signal outputted from a touch screen panel, integrating a sensing signal including periodic pulses by filtering pulses containing noise, and compensating for the sensing signal using noise detection information.

In an embodiment, a signal processing circuit for a touch screen may include: a sensing signal receiver circuit configured to receive a sensing signal including a plurality of periodic pulses from a coupling capacitor of the touch screen, provide a noise detection signal corresponding to a result obtained by detecting noise contained in the pulses of the sensing signal, and generate a first integral signal in respect of the sensing signal by filtering the pulses of which the noise is detected; and a compensation circuit configured to generate a second integral signal by compensating for the first integral signal using the noise detection signal.

In an embodiment, a signal processing circuit for a touch screen may include: a counter configured to count the number of pulses containing noise in a sensing signal including a plurality of periodic pulses outputted from a coupling capacitor of the touch screen; and an arithmetic circuit configured to receive a first integral signal in respect of the sensing signal, and generate a second integral signal by compensating for the level of the first integral signal in response to the number of the pulses containing noise.

In an embodiment, a method for controlling a signal processing circuit for a touch screen may include: providing a noise detection signal corresponding to a result obtained by detecting pulses containing noise in a sensing signal including a plurality of periodic pulses and outputted from a coupling capacitor of the touch screen; generating an integration control signal in response to the noise detection signal; generating a first integral signal for the pulses of the sensing signal of which the pulses containing noise are filtered, using the integration control signal; and generating a second integral signal by compensating for the first integral signal using the noise detection signal.

DETAILED DESCRIPTION

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Figure 1:
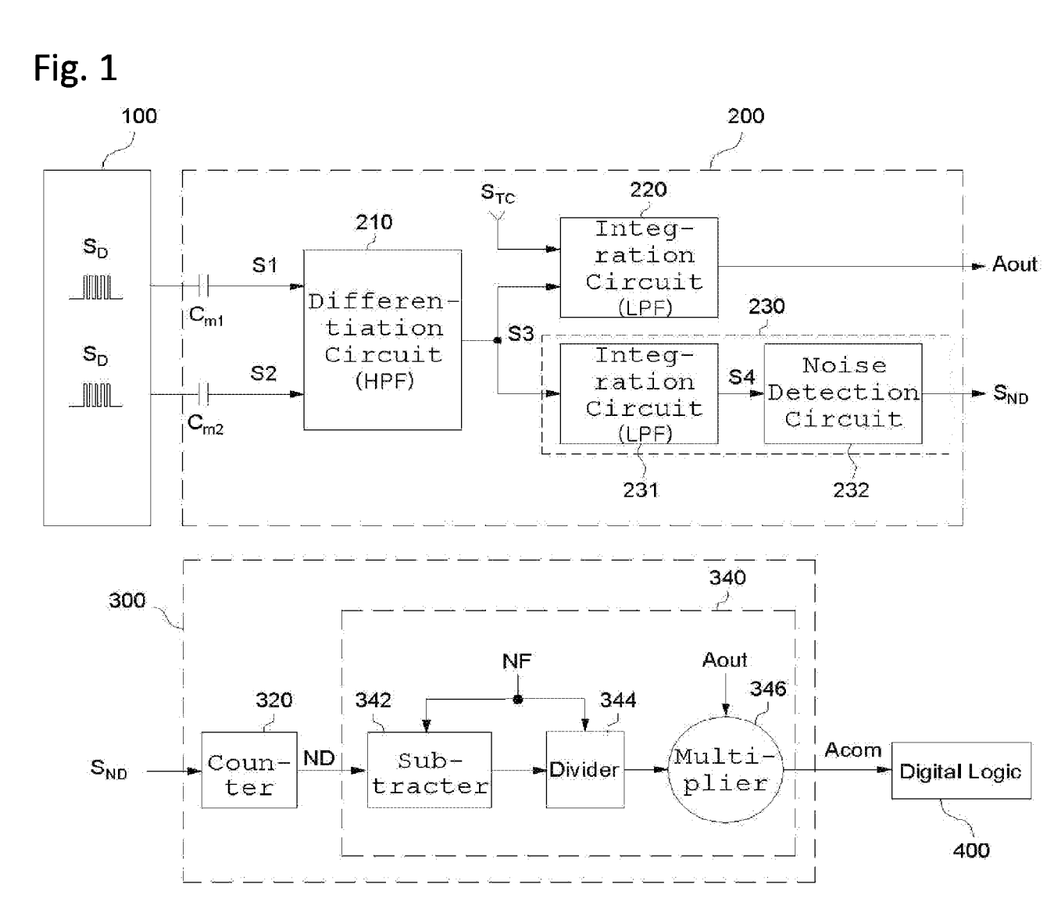
FIG. 1 illustrates a signal processing circuit for a touch screen in accordance with an embodiment of the present invention.

FIG. 1 illustrates a signal processing circuit for a touch screen in accordance with an embodiment of the present invention.

Referring to FIG. 1, the signal processing circuit for a touch screen in accordance with the embodiment of the present invention may include a sensing signal receiver circuit 200. The sensing signal receiver circuit 200 may receive a driving signal $S_D$ provided from a driving circuit 100, and include a differentiation circuit 210, an integration circuit 220, and a detection circuit 230.

The driving circuit 100 may be configured to sequentially provide the driving signal $S_D$ to driving lines (not illustrated) of the touch screen panel.

Coupling capacitors $C_{m1}$ and $C_{m2}$ configured to output sensing signals S1 and S2 corresponding to the driving signal $S_D$ may correspond to the touch screen panel. The coupling capacitors $C_{m1}$ and $C_{m2}$ may be physically included in the touch screen. For circuit analysis, however, FIG. 1 illustrates that the coupling capacitors $C_{m1}$ and $C_{m2}$ are included in the sensing signal receiver circuit 200, and the touch screen panel is not separately illustrated. Each of the coupling capacitors $C_{m1}$ and $C_{m2}$ may be formed at a node between a driving electrode and a receiving electrode. The driving electrode of the coupling capacitor $C_{m1}$ or $C_{m2}$ may receive the driving signal $S_D$ transmitted through a driving line. Furthermore, the receiving electrode of the coupling capacitor $C_{m1}$ or $C_{m2}$ may be coupled to the differentiation circuit 210 through a sensing line (not illustrated), and output the sensing signal S1 or S2.

The capacitance of the coupling capacitors $C_{m1}$ and $C_{m2}$ may be changed according to whether a user's touch occurs, and the sensing signals S1 and S2 may have information on the change in capacitance of the coupling capacitors $C_{m1}$ and $C_{m2}$. That is, the sensing signals S1 and S2 may have information for determining whether a user touched the touch screen panel.

The driving signal $S_D$ may include a square wave signal containing a plurality of periodic pulses. The sensing signals S1 and S2 may be provided to the differentiation circuit 210 in response to the driving signal SD. Thus, the sensing signals S1 and S2 may include a square wave signal containing a plurality of periodic pulses, like the driving signal.

The differentiation circuit 210 may generate a differential signal S3 by differentiating the sensing signals S1 and S2 outputted from the respective coupling capacitors $C_{m1}$ and $C_{m2}$. The differentiation circuit 210 may be configured to process the sensing signal S1 of one channel or the sensing signals S1 and S2 of two channels. When the differentiation circuit 210 processes the sensing signal S1 of one channel, it may be referred to as a single mode, and when the differentiation circuit 210 processes the sensing signals S1 and S2 of two adjacent channels, it may be referred to as a differential mode. In the single mode, the differentiation circuit 210 may differentiate the sensing signal S1 of one channel, and output the differential signal S3 corresponding to a change of the signal. In the differential mode, the differentiation circuit 210 may differentiate the sensing signals S1 and S2 of two channels, and output the differential signal S3.

The integration circuit 220 may be operated in response to an integration control signal $S_{TC}$. The integration circuit 220 may integrate the differential signal S3 so as to remove continuous noise, or prevent peaking noise from being transferred to the next stage without integrating the differential signal S3 corresponding to a pulse containing noise.

The continuous noise may have a lower or higher frequency band than the frequency of the driving signal $S_D$. For example, the continuous noise may include 60 Hz noise generated from a fluorescent lamp or three-wave noise generated from a three-wave inverter lamp.

On the other hand, the peaking noise may include noise having a peak component, such as display noise generated when a display is driven or charger noise generated when a battery is charged.

The detection circuit 230 may include an integration circuit 231 and a noise detection circuit 232. The integration circuit 231 may integrate the differential signal S3, and the noise detection circuit 232 may generate a noise detection signal $S_{ND}$ indicating whether peaking noise is contained the sensing signals S1 and S2 using an integral signal S4 of the integration circuit 231. The detection circuit 230 may include an integration control signal generation circuit of FIG. 6, which will be described below. The integration control signal generation circuit may generate the integration control signal $S_{TC}$ using the noise detection signal $S_{ND}$, and provide the integration control signal $S_{TC}$ to the integration circuit 220.

From the point of view in which the sensing signals S1 and S2 are processed, it may be understood that the sensing signal receiver circuit 200 in accordance with the embodiment of the present invention includes a main signal path and a noise detection path. The main signal path may include the differentiation circuit 210 and the integration circuit 220, and band-pass filter continuous noise contained in the sensing signals S1 and S2 or filter peaking noise. The noise detection path may include the differentiation circuit 210, the integration circuit 231, and the noise detection circuit 232. When a pulse containing peaking noise is sensed from the sensing signals S1 and S2, the noise detection path may generate a signal used for filtering of the main signal path (for example, the noise detection signal $S_{ND}$ or the integration control signal $S_{TC}$).

As described above, the sensing signal receiver circuit 200 illustrated in FIG. 1 may receive the sensing signals S1 and S2 containing a plurality of periodic pulses from the coupling capacitors $C_{m1}$ and $C_{m2}$ of the touch screen, provide the noise detection signal $S_{ND}$ corresponding to a result obtained by detecting pulses containing noise in the sensing signals S1 and S2, and generate an integral signal Aout of which the pulses containing noise are filtered.

The signal processing circuit of FIG. 1 may include a compensation circuit 300, and the compensation circuit 300 may be configured to generate an integral signal Acom by compensating for the level of the integral signal Aout using the noise detection signal $S_{ND}$. The integral signal Acom obtained by compensating for the level of the integral signal Aout through the compensation circuit 300 may be provided to a digital logic 400, and the digital logic 400 may perform touch recognition using the integral signal Acom.

The integration circuit 300 may calculate the number of pulses containing noise in the sensing signals S1 and S2, using the noise detection signal $S_{ND}$, and generate the integral signal Acom by compensating for the level of the integral signal Aout according to the number of pulses. Desirably, the compensation circuit 300 may compensate for the level of the integral signal Aout in proportion to a value obtained by subtracting the number of pulses containing noise from the number of entire pulses of the sensing signal, in order to generate the integral signal Acom. At this time, the integral signal Acom may be compensated for by increasing the level of the integral signal Aout.

For this operation, the integration circuit 300 may include a counter 320 and an arithmetic circuit 340. The counter 320 may count the number of pulses containing noise in the sensing signal by counting the noise detection signal $S_{ND}$, and the arithmetic circuit 340 may generate the integration circuit Acom by compensating for the level of the integral signal Aout in response to the number of pulses containing noise.

The arithmetic circuit 340 may include a subtracter 342, a divider 344, and a multiplier 346. The subtracter 342 may subtract the number of pulses containing noise from the number of entire pulses of the sensing signal. The divider 344 may divide the number of entire pulses of the sensing signal by a value provided from the subtracter 342. The multiplier 346 may generate the integral signal Acom by multiplying the integral signal Aout by a value provided from the divider 344.

The respective units of the signal processing circuit of FIG. 1 will be described in more detail.

Figure 2:
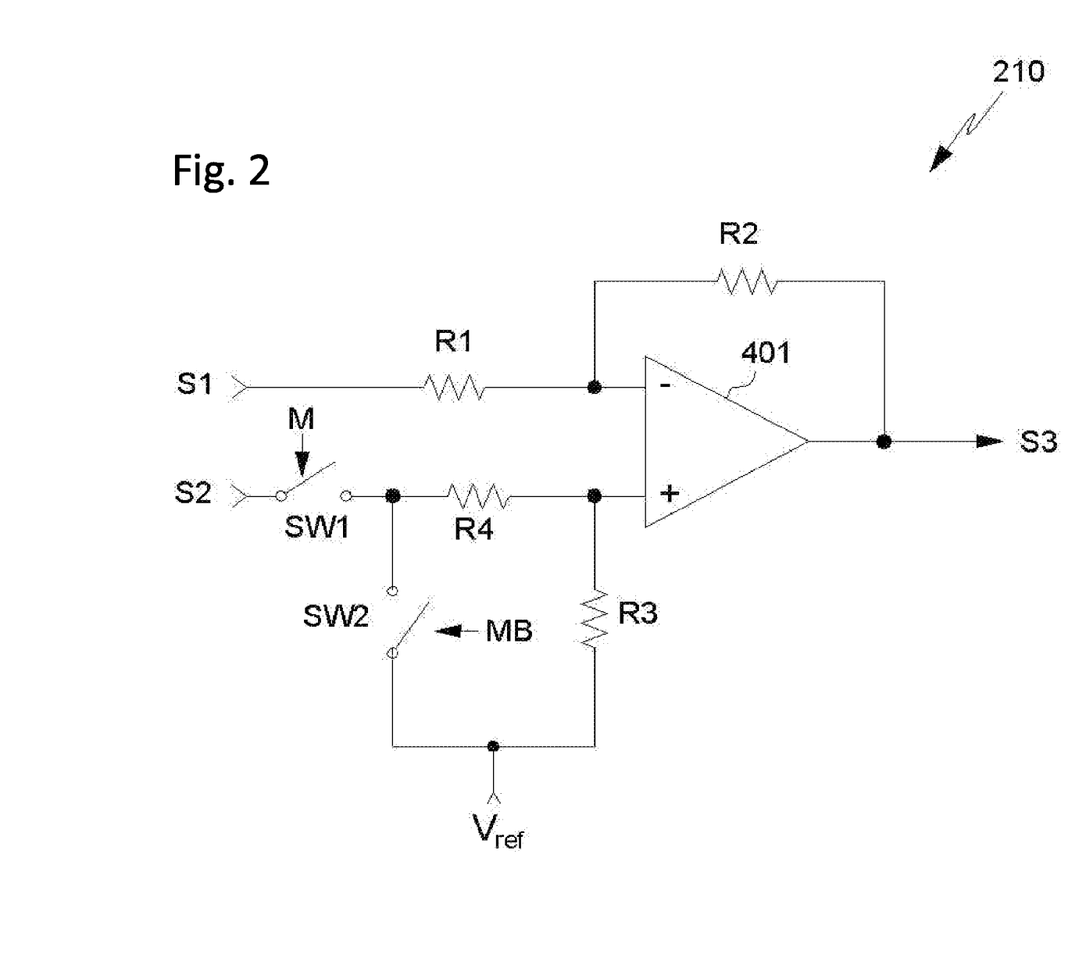
FIG. 2 illustrates an example of a differentiation circuit 210 of FIG. 1.

FIG. 2 illustrates an example of the differentiation circuit 210 of FIG. 1. The differentiation circuit 210 may include an amplifier 401, a resistor R1, a resistor R2, a resistor R3, a resistor R4, a switch SW1, and a switch SW2.

The amplifier 401 may differentiate the sensing signals S1 and S2 applied through the coupling capacitors $C_{m1}$ and $C_{m2}$, respectively, and generate the differential signal S3. The amplifier 401 may have a negative input terminal (−) coupled to the resistor R1 to which the sensing signal S1 is applied, and the resistor R2 may be formed between the negative input terminal (−) and an output terminal of the amplifier 401. The amplifier 401 may have a positive input terminal (+) coupled to the resistor R4, and the resistor R4 may be configured to receive the sensing signal S2 through the switch SW1. The resistor R3 and the switch SW2 may be formed at both ends of the resistor R4, and the resistor R3 and the switch SW2 may be configured to commonly receive a reference voltage.

The switch SW1 may be configured to transmit the sensing signal S2 to the positive input terminal (+) of the amplifier 401 through the resistor R4 in response to a differential mode signal M indicating the differential mode operation, and the switch SW2 may be configured to transmit the reference voltage Vref to a node between the switch SW1 and the resistor R4 in response to a single mode signal MB. The single mode signal MB is a signal for controlling the single mode operation. The signal mode signal MB may have the same magnitude as the differential mode signal M, and may have the opposite phase to the differential mode signal M.

The operation mode of the differentiation circuit 210 may be selected in response to activation of the signal mode signal MB or the differential mode signal M.

In the case of the single mode, the switch SW1 may be turned off, and the switch SW2 may be turned on. In the single mode, the differentiation circuit 210 may differentiate the sensing signal S1.

In the case of the differential mode, the switch SW1 may be turned on, and the switch SW2 may be turned off. In the differential mode, the differentiation circuit 210 may differentiate a difference between the input signals S1 and S2.

The resistor R1, the resistor R2, the resistor R3, and the resistor R4 of FIG. 2 may be implemented with variable resistors. The differentiation circuit 210 of FIG. 2 may control gain and frequency characteristics by adjusting the magnitudes of the resistors R1 and R2 or the resistors R3 and R4, and have a high-pass filter (HPF) function.

Figure 3:
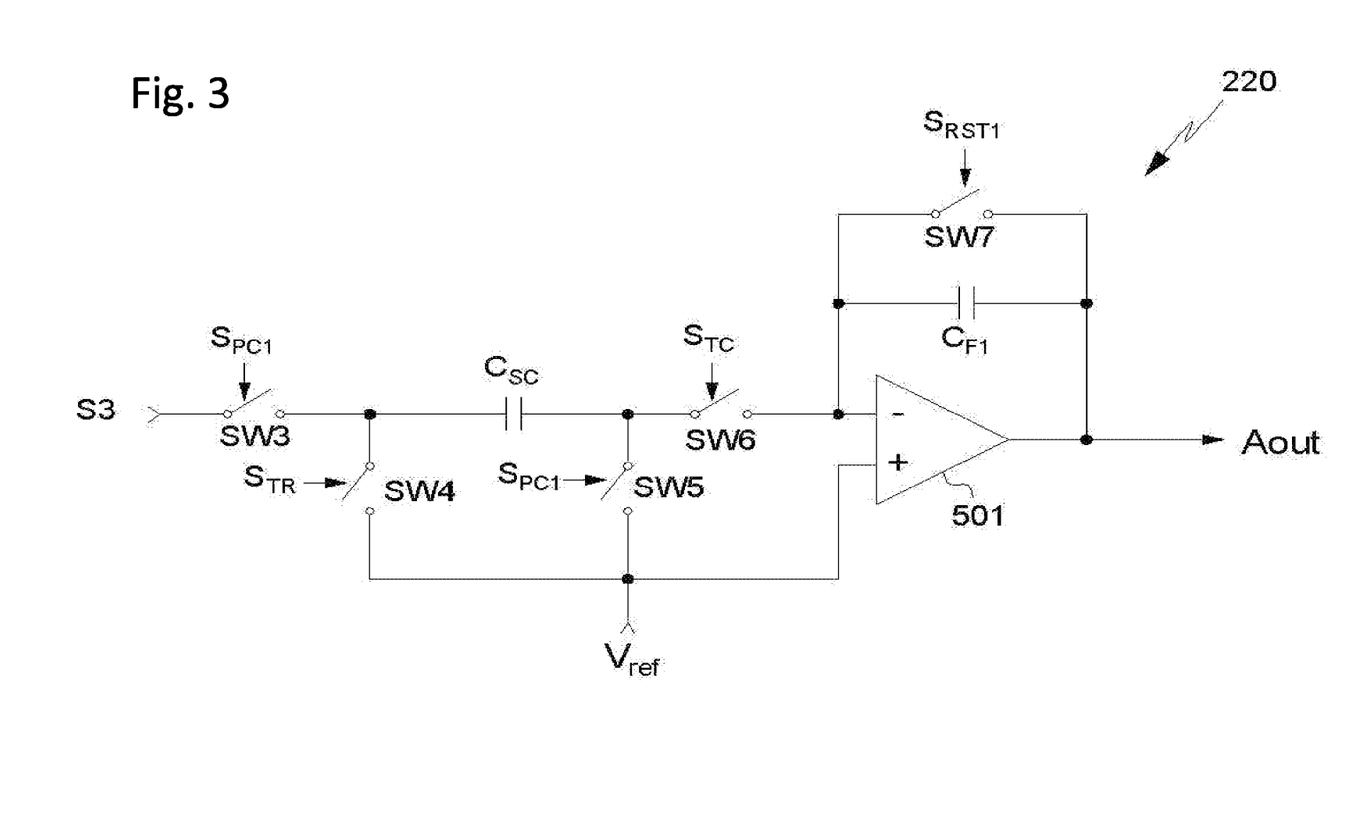
FIG. 3 illustrates an example of an integration circuit 220 of FIG. 1.

FIG. 3 illustrates an example of the integration circuit 220 in accordance with the embodiment of the present invention. The integration circuit 220 may function as a finite impulse response filter having a switching frequency which coincides with the frequency of the driving signal $S_D$.

The differentiation circuit 220 may include an amplifier 501, a switched capacitor $C_{SC}$, switches SW3 to SW7, and a feedback capacitor $C_{F1}$. The switched capacitor $C_{SC}$ and the feedback capacitor $C_{F1}$ may be implemented with variable capacitors capable of controlling the gain and frequency characteristics of the integration circuit 220.

The amplifier 501 may have a positive input terminal (+) configured to receive the reference voltage $V_{ref}$. Furthermore, the amplifier 501 may have a negative input terminal (−) coupled to the switch SW6. The feedback capacitor $C_{F1}$ and the switch SW7 may be coupled in parallel to each other, and coupled between the negative input terminal (−) and an output terminal of the amplifier 501. The amplifier 501 may generate a first integral signal Aout by integrating the differential signal S3.

The switched capacitor $C_{SC}$ may be coupled between the switch SW3 and the switch SW6, and the switch SW3 may switch transmission of the differential signal S3. The switch SW4 for switching the reference voltage $V_{ref}$ may be coupled to a node between the switched capacitor $C_{SC}$ and the switch SW3, and the switch SW5 for switching the reference voltage $V_{ref}$ may be coupled to a node between the switched capacitor $C_{SC}$ and the switch SW6.

The switched capacitor $C_{SC}$ and the feedback capacitor $C_{F1}$ may be implemented with variable capacitors. Furthermore, the switched capacitor $C_{SC}$ may have a resistance characteristic which is determined according to capacitance and the switching frequency of the switches SW3 to SW6. The integration circuit 220 may integrate the differential signal S3 through the amplifier 501, the switched capacitor $C_{SC}$, and the feedback capacitor $C_{F1}$.

The switch SW3 may be configured to transmit the differential signal S3 to the switched capacitor $C_{SC}$ in response to a first precharge signal $S_{PC1}$. The switch SW4 may be configured to transmit the reference voltage $V_{ref}$ to the switched capacitor $C_{SC}$ in response to a charge transfer signal $S_{TR}$. The switch SW5 may be configured to apply the reference voltage $V_{ref}$ to a node between the switched capacitor $C_{SC}$ and the switch SW6 in response to the first precharge signal $S_{PC1}$. The switch SW6 may be configured to couple the switched capacitor $C_{SC}$ to the negative input terminal (−) of the amplifier 501 in response to the integration control signal $S_{TC}$. The switch SW7 may reset the feedback capacitor $C_{F1}$ in response to a first reset signal $S_{RST1}$.

Figure 5:
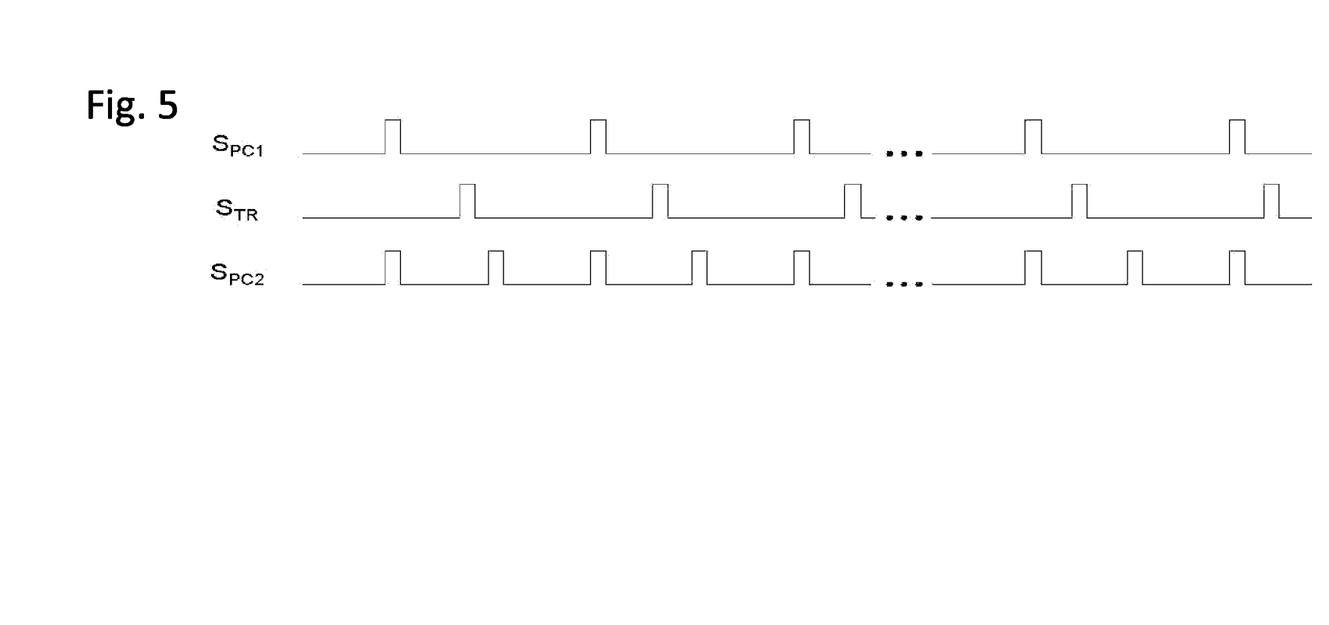
FIG. 5 is a waveform diagram used in the signal processing circuit for a touch screen in accordance with the embodiment of the present invention.

At this time, the first precharge signal SPC1 and the charge transfer signal STR are non-overlap two phase signals having no period in which the signals overlap each other, as illustrated in FIG. 5. The first precharge signal SPC1 and the charge transfer signal STR may be used to prevent charge leakage caused by switches which are shorted at the same time.

The integration circuit 220 may integrate a differential signal corresponding to a plurality of periodic pulses contained in a sensing signal. In this case, the integration circuit 220 may integrate any one of a falling differential signal and a rising differential signal. The integration circuit 220 may control the number of operations to integrate the differential signal, and generate a null frequency while moving the frequencies of the differential signal to a low frequency band around the frequency of the driving signal $S_D$. When the number of integrations is adjusted, the null frequency may be adjusted to remove expected noise. For example, when occurrence of noise is expected at 50 kHz, the integration circuit 220 may generate a null frequency of 50 kHz by adjusting the number of integrations, thereby removing 50 kHz noise.

The integration control signal $S_{TC}$ is a signal for determining whether to transfer charge stored in the switched capacitor $C_{SC}$ to the negative input terminal (−) of the amplifier 501, and related to the charge transfer signal $S_{TR}$. When the integration control signal $S_{TC}$ turns on the switch SW6, the charge stored in the switched capacitor $C_{SC}$ may be transferred to the negative input terminal (−) of the amplifier 501 in response to the charge transfer signal $S_{TR}$, and the integration circuit 220 may integrate the differential signal S3. However, when the integration control signal $S_{TC}$ turns off the switch SW6, the charge stored in the switched capacitor $C_{SC}$ may be blocked from being transferred to the amplifier 501, regardless of the charge transfer signal $S_{TR}$.

The above-described integration circuit 220 may have a low-pass filter (LPF) function.

Figure 4:
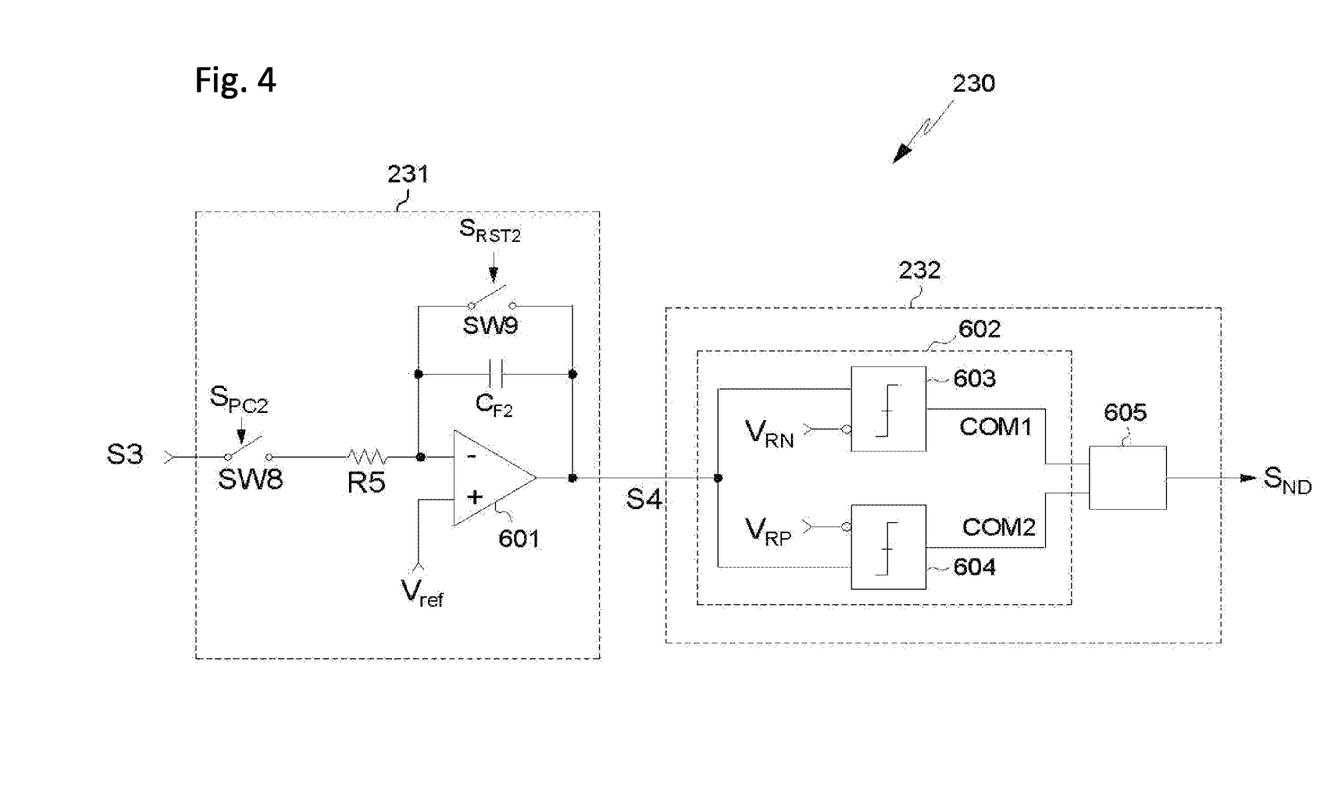
FIG. 4 illustrates an example of a detection circuit 230 of FIG. 1.

FIG. 4 illustrates an example of the detection circuit 230 in accordance with the embodiment of the present invention. The detection circuit 230 may include an integration circuit 231 and a noise detection circuit 232.

The integration circuit 231 may include an amplifier 601, a resistor R5, a switch SW8, a switch SW9, and a feedback capacitor $C_{F2}$. The amplifier 601 may have a positive input terminal (+) configured to receive the reference voltage $V_{ref}$, and the resistor R5 may be coupled to the negative input terminal (−). The switch SW9 and the feedback capacitor $C_{F2}$ may be coupled in parallel to each other, and coupled between the negative input terminal (−) and an output terminal of the amplifier 601. The switch SW8 may be configured to transmit the differential signal S3 to the resistor R5 in response to a second precharge signal $S_{PC2}$. The switch SW9 may reset the feedback capacitor $C_{F2}$ in response to a second reset signal $S_{RST2}$. In the present embodiment, the integration circuit 231 may be implemented with an RC integrator. However, the integration circuit 231 is not limited thereto, but may include a switched capacitor integrator. In the integration circuit 231, the resistor R5 may be implemented with a variable resistor, and the feedback capacitor $C_{F2}$ may be implemented with a variable capacitor.

The integration circuit 231 may generate an integral signal S4 by integrate both a falling differential signal and a rising differential signal. The falling differential signal and the rising differential signal may have the same magnitude and the opposite direction. Thus, when the differential signal S3 has no peaking noise, the integral signal S4 may have a level corresponding to the reference voltage $V_{ref}$, regardless of whether a touch occurred. On the other hand, when the differential signal S3 contains peaking noise, the integral signal S4 may have a higher or lower level than the reference voltage $V_{ref}$.

The noise detection circuit 232 may check whether the integral signal S4 has a level corresponding to the reference voltage $V_{ref}$, and determine whether peaking noise is contained. Since the integral signal S4 may have a lower or higher level than the reference voltage $V_{ref}$ due to peaking noise, a first comparison voltage $V_{RN}$ smaller than the reference voltage $V_{ref}$ and a second comparison voltage $V_{RP}$ larger than the reference voltage $V_{ref}$ may be used as a signal for determining whether the differential signal S3 contains peaking noise.

The noise detection circuit 232 may include a comparison unit 602 and an arithmetic circuit 605. The comparison unit 602 may include a comparator 603 and a comparator 604. The comparator 603 may compare the integral signal S4 to the first comparison voltage $V_{RN}$ and generate a first comparison signal COM1, and the comparator 604 may compare the integral signal S4 to the second comparison voltage $V_{RP}$ and generate a second comparison signal COM2. The first and second comparison voltages VRN and VRP may be determined according to the magnitude of peaking noise to be sensed. The first comparison signal COM1 may be activated when the second integral signal S4 is smaller than the first comparison voltage $V_{RN}$, and the second comparison signal COM2 may be activated when the second integral signal S4 is larger than the second comparison voltage $V_{RP}$.

The arithmetic circuit 605 may activate the noise detection signal $S_{ND}$ according to the logic states of the first and second comparison signals COM1 and COM2. The first and second comparison signals COM1 and COM2 may be activated when the driving signal $S_D$ contains peaking noise. Thus, the noise detection signal $S_{ND}$ may be activated when any one of the first and second comparison signals COM1 and COM2 is activated. Thus, the arithmetic circuit 605 may be configured in consideration of the above-described logic. For example, the arithmetic circuit 605, which activates the noise detection signal $S_{ND}$ when the first and second comparison signals COM1 and COM2 are activated to a logic high state, may be implemented with two input OR gates. On the other hand, the arithmetic circuit 605, which activates the noise detection signal $S_{ND}$ when the first and second comparison signals COM1 and COM2 are activated to a logic low state, may be implemented with two input AND gates.

Referring to FIG. 5, the frequency of the second precharge signal $S_{PC2}$ of the integration circuit 231 may be set to be two times larger than the frequency of the first precharge signal $S_{PC1}$ of the integration circuit 220.

The reason why the first and second precharge signals $S_{PC1}$ and $S_{PC2}$ have a frequency difference therebetween is that the integration circuit 220 generates the integral signal S4 by sampling and integrating one differential signal of the falling differential signal and the rising differential signal, but the integration circuit 231 generates the integral signal S4 by integrating both the falling differential signal and the rising differential signal. Thus, non-overlap two phase signals may be used as charge transfer signal $S_{TR}$ and the first precharge signal $S_{PC1}$.

Figure 6:
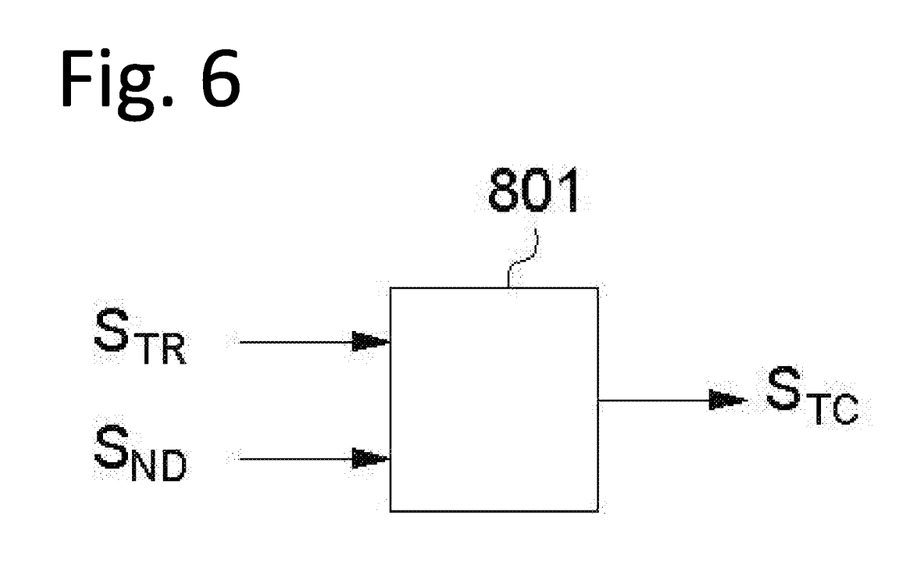
FIG. 6 illustrates an integration control signal generation circuit to generate an integration control signal.

FIG. 6 illustrates an integration control signal generation circuit in accordance with an embodiment of the present invention. The integration control signal generation circuit 801 may be designed in consideration of the characteristic of the integration control signal $S_{TC}$ described with reference to FIG. 3. The integration control signal generation circuit 801 may generate the integration control signal $S_{TC}$ for controlling the integration circuit 220 to not perform integration, when the sensing signal contains peaking noise.

For example, when the noise detection signal $S_{ND}$ is deactivated because the differential signal S3 contains no peaking noise, the integration control signal $S_{TC}$ may be generated to control the integration circuit 220 to perform integration according to whether the charge transfer signal $S_{TR}$ is activated. When the noise detection signal $S_{ND}$ is activated because the differential signal S3 contains peaking noise, the integration control signal $S_{TC}$ may be generated at a level for controlling the integration circuit 220 to not perform integration, regardless of whether the charge transfer signal $S_{TR}$ is activated. In the present embodiment, the integration control signal $S_{TC}$ may be generated through an AND operation between the noise detection signal $S_{ND}$ and the charge transfer signal $S_{TR}$. However, the integration control signal $S_{TC}$ is not limited thereto. The integration control signal generation circuit 801 may be included in the detection circuit 230 or the noise detection circuit 232.

Figure 7:
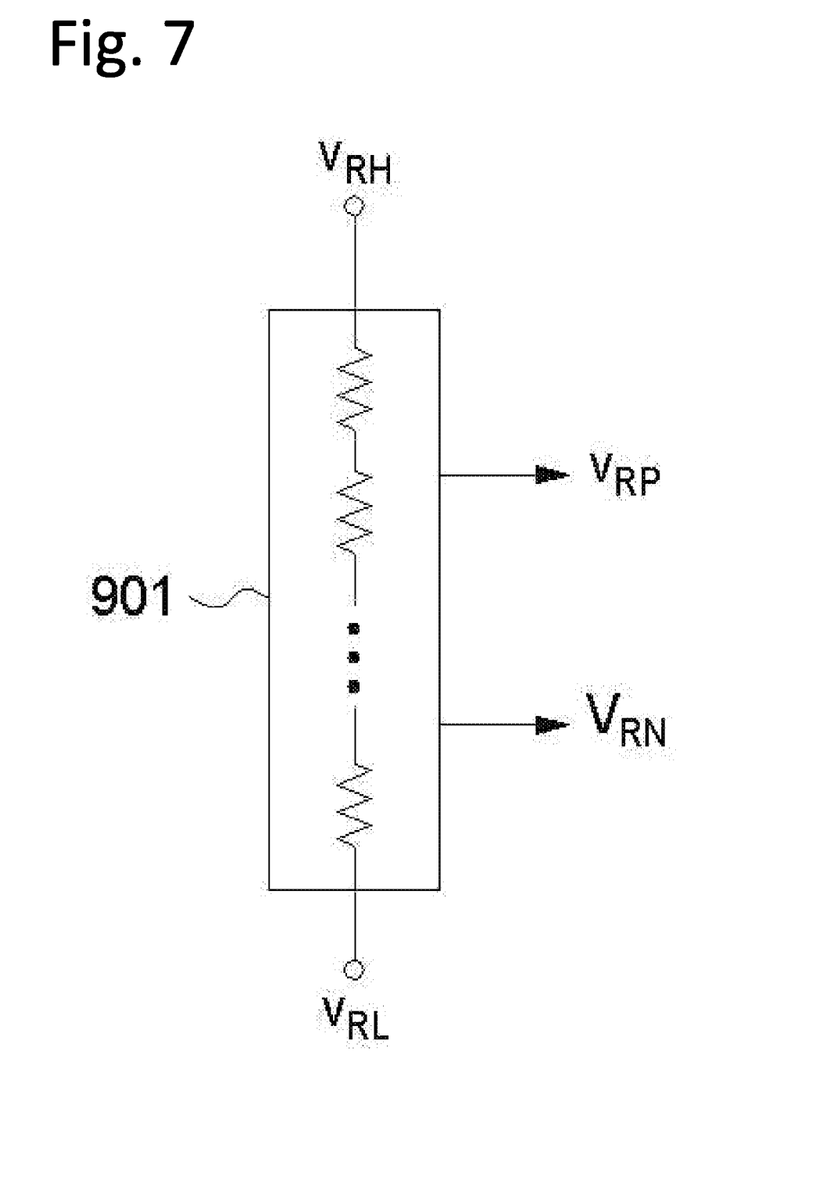
FIG. 7 illustrates a comparison voltage generator in accordance with the embodiment of the present invention.

FIG. 7 illustrates a comparison voltage generator in accordance with an embodiment of the present invention. The comparison voltage generator 901 may include resistors coupled in series between a high reference voltage $V_{RH}$ and a low reference voltage $V_{RL}$ which have different levels. The first and second comparison voltages $V_{RN}$ and $V_{RP}$ may be selected from node voltages of the resistors coupled in series. The intermediate voltage between the high reference voltage $V_{RH}$ and the low reference voltage $V_{RL}$ may correspond to the reference voltage $V_{ref}$ used in the integration circuit 231. The comparison voltage generator 901 may be included in the comparator 602 of the noise detection circuit 232.

Figure 8:
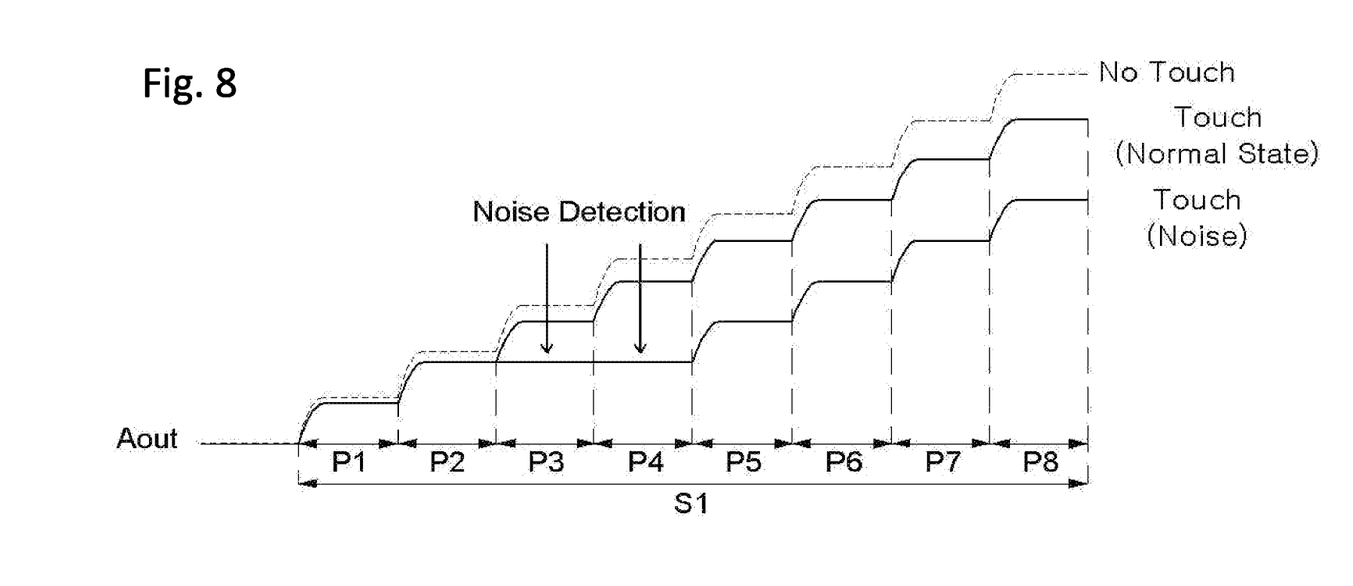
FIG. 8 is a waveform diagram for explaining a process of compensating for an integral signal in accordance with the embodiment of the present invention.

FIG. 8 is a diagram for explaining the operation of the signal processing circuit in accordance with the embodiment of the present invention. FIG. 8 illustrates the integral signal Aout outputted from the integration circuit 220. In FIG. 8, the case in which no touch occurred and integration for normal sensing signals S1 and S2 was performed may be indicated by a dotted line and referred to as "case A", the case in which a touch occurred and integration for normal signals S1 and S2 having no pulses containing noise was performed may be indicated by an upper solid line and referred to as "case B", and the case in which a touch occurred and integration for abnormal sensing signals S1 and S2 having pulses containing noise was performed may be indicated by a lower solid line and referred to as "case C".

The level of the integral signal Aout decreases when a touch occurs. Furthermore, a pulse containing noise is not integrated in accordance with the embodiment of the present invention. Thus, when a touch occurs, the integral signal Aout for the abnormal sensing signals S1 and S2 having pulses containing noise has a lower level than when a touch occurs in a normal state.

Hereafter, the operation of the signal processing circuit in accordance with the embodiment of the present invention will be described in detail with reference to FIG. 8.

As described above, the differentiation circuit 210 may output the differential signal S3 for the sensing signals S1 and S2 of two adjacent channels.

The sensing signals S1 and S2 may be generated at the same time in response to one driving signal $S_D$, and include a plurality of periodic pulses like the driving signal $S_D$. The differentiation circuit 210 may differentiate pulses corresponding to the respective periods P1 to P8 of each of the sensing signals S1 and S2, and output the differential signal S3. Thus, when each of the sensing signals S1 and S2 contains noise, the noise may be reflected into the differential signal S3.

In the case A and the case B, the noise detection circuit 232 may detect no noise. Thus, the noise detection signal $S_{ND}$ outputted from the noise detection circuit 232 may maintain a deactivated state. The integration circuit 220 may receive the deactivated integration control signal $S_{TC}$, and normally integrate the differential signal because the switch SW6 is turned on. Thus, in the case A and the case B, the integration circuit 220 may output the integral signal Aout having a waveform which periodically increases even though a level difference exists therebetween.

Furthermore, since the noise detection signal $S_{ND}$ maintains the deactivated state in the case A and the case B, the counter 320 of the compensation circuit 300 may not perform a counting operation. That is, the number of pulses containing noise may be provided as "0". Thus, the subtracter 342 may provide the number of entire pulses of the sensing signal to the divider 344, and the divider 344 may provide a value of "1", obtained by dividing the number of entire pulses of the sensing signal by the number of entire pulses of the sensing signal, to the multiplier 346. The multiplier 346 may generate the integral signal Acom by multiplying the integral signal Aout by "1" provided from the divider 344. In the case A and the case B, the compensation circuit 300 may not compensate for the integral signal Aout, while outputting the integral signal Aout as the integral signal Acom.

On the other hand, in the case C, the noise detection circuit 232 may detect noise, and the noise detection signal $S_{ND}$ outputted from the noise detection circuit 232 may be activated in periods where noise is detected (the period P3 and P4 in FIG. 8). The integration circuit 220 may receive the activated integration control signal $S_{TC}$ in response to the periods in which noise is detected. Since the switch SW6 is turned off by the activated integration control signal STC, the integration circuit 220 may not integrate the differential signal. That is, the value of the integral signal Aout may be maintained. In the other periods where noise is not detected in the case C, the integration circuit 220 may output the integral signal Aout having a waveform which periodically increases as in the case B.

Furthermore, in the case C, the noise detection signal $S_{ND}$ may be activated in the periods where noise is detected. Thus, the counter 320 of the compensation circuit 300 may perform a counting operation. Referring to FIG. 8, noise was detected in the periods P3 and P4. Thus, the counter 320 may provide the number of pulses containing noise as "2". Then, the subtracter 342 may subtract the number of pulses containing noise, that is, "2" from the number of entire pulses of the sensing signal and provide the subtraction result to the divider 344, and the divider 344 may divide the number of entire pulses of the sensing signal by the value provided from the subtracter 342 and provide the division result to the multiplier 346. The multiplier 346 may generate the integral signal Acom by multiplying the integral signal Aout by the value provided from the divider 344. As described above, the compensation circuit 300 may perform compensation by increasing the integral signal Aout in proportion to the number of pulses containing noise, in response to the case C.

In order to describe a specific example, the following supposition may be applied. One sensing signal may include eight periodic pulses. In the case B, the integration circuit 220 may increase the level of the integral signal Aout to a value corresponding to "100" in response to each pulse, and the level of the final integral signal Aout corresponding to one sensing signal is "800". In the case C, the number of pulses containing noise is "2", and the level of the final integral signal Aout corresponding to one sensing signal is "600". According to the above-described supposition, the level of the final integral signal Aout in the case C decreases by "200" in comparison to the case B, due to the pulses containing noise.

In the case C, the counter 320 may provide the number of pulses containing noise as "2", the subtracter 342 may subtract "2" as the number of pulses containing noise from "8" as the number of entire pulses of the sensing signal, and provide the subtraction result of "6" to the divider 344, and the divider 344 may divide "8" as the number of entire pulses of the sensing signal by "6" provided from the subtracter 342 and provide the division result to the multiplier 346. The multiplier 346 may generate the integral signal Acom by multiplying the integral signal Aout by the value of "8/6" provided from the divider 344. As described above, the compensation circuit 300 may correct the integral signal Aout into a value close to that of the case B, in response to the case C.

Thus, the signal processing circuit in accordance with the embodiment of the present invention may integrate a sensing signal for touch detection while avoiding noise, and compensate for the sensing signal using the noise detection information. Thus, it is possible to improve touch recognition corresponding to a user's touch.

In accordance with the embodiment of the present invention, the signal processing circuit may integrate a sensing signal by filtering pulses containing noise. Thus, the signal processing circuit may detect a touch while avoiding noise.

Furthermore, the signal processing circuit may integrate a sensing signal by filtering pulses containing noise, and compensate for the sensing signal using noise detection information, thereby improving touch recognition corresponding to a user's touch.

Furthermore, the signal processing circuit may improve the signal-to-noise ratio of the sensing signal provided from the touch screen panel because noise is avoided.

While various embodiments have been described above, it will be understood to those skilled in the art that the embodiments described are by way of example only. Accordingly, the disclosure described herein should not be limited based on the described embodiments.

What is claimed is:

1. A signal processing circuit for a touch screen, comprising:

a sensing signal receiver circuit configured to receive a sensing signal including a plurality of periodic pulses from a coupling capacitor of the touch screen, provide a noise detection signal corresponding to a result obtained by detecting noise contained in the pulses of the sensing signal, and generate a first integral signal in respect of the sensing signal by filtering the pulses of which the noise is detected; and a compensation circuit configured to generate a second integral signal by compensating for the first integral signal using the noise detection signal.

2. The signal processing circuit of claim 1, wherein the sensing signal receiver circuit generates a differential signal by differentially amplifying a pair of sensing signals corresponding to adjacent sensing lines, and performs the detection of the noise and the generation of the first integral signal using the differential signal.

3. The signal processing circuit of claim 1, wherein the sensing signal receiver circuit comprises an integration control signal generation circuit configured to generate an integration control signal in response to the noise detection signal, and filters the pulses of which the noise is detected using the integration control signal.

4. The signal processing circuit of claim 3, wherein the sensing signal receiver circuit comprises:

a differentiation circuit configured to output a differential signal obtained by differentiating the sensing signal;

a detection circuit configured to detect the pulses containing noise using the differential signal, and provide the noise detection signal corresponding to a result obtained by detecting the noise; and an integration circuit configured to generate the first integral signal by integrating the differential signal, and perform filtering to extrude the pulses containing noise from the first integral signal according to the integration control signal.

5. The signal processing circuit of claim 1, wherein the compensation circuit calculates the number of the pulses containing noise in the sensing signal using the noise detection signal, and generates the second integral signal by compensating for the level of the first integral signal in response to the number of the pulses.

6. The signal processing circuit of claim 5, wherein the compensation circuit generates the second integral signal by compensating for the level of the first integral signal in proportion to a value obtained by subtracting the number of the pulses containing noise from the number of entire pulses of the sensing signal.

7. The signal processing circuit of claim 6, wherein the compensation circuit compensates for the level of the first integral signal by increasing the level of the first integral signal.

8. The signal processing circuit of claim 1, wherein the compensation circuit comprises:

a counter configured to count the number of the pulses containing noise in the sensing signal by counting the noise detection signal; and an arithmetic circuit configured to generate the second integral signal by compensating for the level of the first integral signal in response to the number of the pulses containing noise.

9. The signal processing circuit of claim 8, wherein the arithmetic circuit comprises:

a subtracter configured to subtract the number of the pulses containing noise from the number of entire pulses of the sensing signal;

a divider configured to divide the number of the entire pulses of the sensing signal by a value provided from the subtracter; and a multiplier configured to generate the second integral signal by multiplying the first integral signal by a value provided from the divider.

10. A signal processing circuit for a touch screen, comprising:

a counter configured to count the number of pulses containing noise in a sensing signal including a plurality of periodic pulses outputted from a coupling capacitor of the touch screen; and an arithmetic circuit configured to receive a first integral signal in respect of the sensing signal, and generate a second integral signal by compensating for the level of the first integral signal in response to the number of the pulses containing noise.

11. The signal processing circuit of claim 10, wherein the arithmetic circuit generates the second integral signal by compensating for the level of the first integral signal in proportion to a value obtained by subtracting the number of the pulses containing noise from the number of the entire pulses of the sensing signal.

12. The signal processing circuit of claim 10, wherein the arithmetic circuit comprises:

a subtracter configured to subtract the number of the pulses containing noise from the number of the entire pulses of the sensing signal;

a divider configured to divide the number of the entire pulses of the sensing signal by a value provided from the subtracter; and a multiplier configured to generate the second integral signal by multiplying the first integral signal by a value provided from the divider.

13. The signal processing circuit of claim 10, wherein the first integral signal is obtained by integrating the pulses of the sensing signal of which the pulses containing noise are filtered.

14. A method for controlling a signal processing circuit for a touch screen, comprising:

providing a noise detection signal corresponding to a result obtained by detecting pulses containing noise in a sensing signal including a plurality of periodic pulses outputted from a coupling capacitor of the touch screen;

generating an integration control signal in response to the noise detection signal;

generating a first integral signal for the pulses of the sensing signal of which the pulses containing noise are filtered using the integration control signal; and generating a second integral signal by compensating for the first integral signal using the noise detection signal.

15. The method of claim 14, the generating of the second integral signal comprises:

counting, by a counter, the number of the pulses containing noise in the sensing signal;

subtracting, by a subtracter, the number of the pulses containing noise from the number of entire pulses of the sensing signal;

dividing, by a divider, the number of the entire pulses of the sensing signal by a value provided from the subtracter; and generating, by a multiplier, the second integral signal by multiplying the first integral signal by a value provided from the divider.

* * * * *